United States Patent [19]

Gleason

[11] Patent Number: 4,578,008

[45] Date of Patent: Mar. 25, 1986

[54] HAY BALE LOADER

[76] Inventor: Harold T. Gleason, Box 119, Tolna, N. Dak. 58380

[21] Appl. No.: 604,875

[22] Filed: Apr. 27, 1984

[51] Int. Cl.[4] .......................... A01D 87/12; B60P 1/48

[52] U.S. Cl. .................................... 414/24.5; 414/555; 414/732

[58] Field of Search ............... 414/555, 546, 549, 550, 414/551, 111, 24.5, 58, 486, 406, 408, 409, 420, 707, 710, 711, 733, 732

[56] References Cited

U.S. PATENT DOCUMENTS

| | | | |
|---|---|---|---|
| 2,565,792 | 8/1951 | Wagner et al. | 414/546 |
| 2,643,011 | 6/1953 | Brisson et al. | 414/546 X |
| 2,665,016 | 1/1954 | Etchart | 414/551 X |
| 2,704,164 | 3/1955 | David | 414/555 X |
| 2,824,655 | 2/1958 | Harbers | 414/546 |
| 2,933,209 | 4/1960 | Tidwell | 414/547 |
| 2,954,886 | 10/1960 | Nelson | 414/24.5 |
| 3,880,305 | 4/1975 | Van Polen | 414/24.5 |
| 3,946,887 | 3/1976 | Parker | 414/555 X |
| 3,952,881 | 4/1976 | Knudson | 414/58 |
| 4,032,184 | 6/1977 | Blair | 414/58 X |
| 4,056,204 | 11/1977 | Spasuik | 414/555 X |
| 4,091,943 | 5/1978 | Bay-Schmith | 414/555 X |
| 4,257,732 | 3/1981 | Staffanson | 414/24.5 X |
| 4,363,583 | 12/1982 | Bontrager | 414/24.5 |
| 4,478,547 | 10/1984 | Den Boer | 414/555 X |
| 4,543,028 | 9/1985 | Bell et al. | 414/459 X |

FOREIGN PATENT DOCUMENTS

| | | | |
|---|---|---|---|
| 2048820 | 12/1980 | United Kingdom | 414/24.5 |

*Primary Examiner*—Robert J. Spar

*Assistant Examiner*—David A. Bucci

*Attorney, Agent, or Firm*—Burd, Bartz & Gutenkauf

[57] ABSTRACT

A lifting and loading apparatus installed on the front of a load-bearing vehicle for lifting and loading a hay bale or like load located forward of the vehicle by moving it up and over the vehicle cab to position it on the trailer bed. A pivoting lift frame assembly is movably mounted to a stationary frame assembled to the vehicle. The pivoting frame assembly carries load arms which are movable toward and away from one another in side-to-side relationship relative to the vehicle. The load arms are equipped with articulated gripping members that can come together and grip the hay bale. The lift frame assembly is moved to the overhead position with the load arms carrying the hay bale to deposit the hay bale on the vehicle load bed.

17 Claims, 6 Drawing Figures

5
5
10
11
12
13
14
16
17
18
20
23
24
25
26
28
29
30
34
38
39
40
42
43
44
45
51
53
56
57
58
60
61
62
64
66

10
11
12
13
14
16
17
18
20
21
24
32
34
35
36
38
39
44
45
46
48
49
51
52
53
54
56
61
66
67

HAY BALE LOADER

SUMMARY OF THE INVENTION

The present invention relates to machinery for handling and loading hay bales of either cylindrical or rectangular configuration which, for reasons of efficiency, are large and heavy. Such bales are far too cumbersome for manual handling and are loaded for transport from place to place by various mechanical contrivances. Easily lifting and properly positioning the hay bales is a problem which must be resolved for efficient and orderly field management.

According to the present invention, there is provided an apparatus for efficiently loading and properly positioning hay bales for transport from place to place. A standard truck-type vehicle has a forward cab and a rear trailer bed for carrying the hay bales. The trailer can be a tilt bed variety for unloading bales. Loading apparatus on the front of the vehicle is provided for lifting a hay bale located forward of the vehicle, moving it up and over the vehicle cab, and properly positioning it on the trailer bed. A stationary frame is mounted to the front of the vehicle, and a pivoting lift frame assembly is movably mounted to the stationary frame. The lift frame includes a pair of legs straddling the vehicle having fixed ends pivotally mounted to the stationary frame. A cross-brace assembly extends between outer ends of the legs and carries a pair of pivoting arms. The outer ends of the arms are equipped with articulated gripping members or hands pivotally assembled for pivotal movement about a horizontal axis. The arms are movable toward and away from one another through means of fluid motors. The arms are movable toward one another so that the hay bale is grasped between the hands. The pivoting legs are moved upward by means of other fluid motors whereby the hay bale is lifted to an overhead position up and over the vehicle cab. When located in the proper position with respect to the trailer bed, the hay bale is released. Means are provided for limiting the pivotal movement of the hands with respect to the loading arms in order to properly orientate the hay bale over the vehicle bed upon release. The arms are movable from side to side with respect to the forward end of the vehicle in order that one hay bale may be lifted first from one side of the vehicle, a second from another, then a third hay bale can be lifted centrally of the vehicle and placed on top of the first two. The lifting and loading procedure is accomplished without the necessity of the operator leaving the vehicle cab.

IN THE DRAWINGS

DESCRIPTION OF A PREFERRED EMBODIMENT

Figures 1, 3, 4:
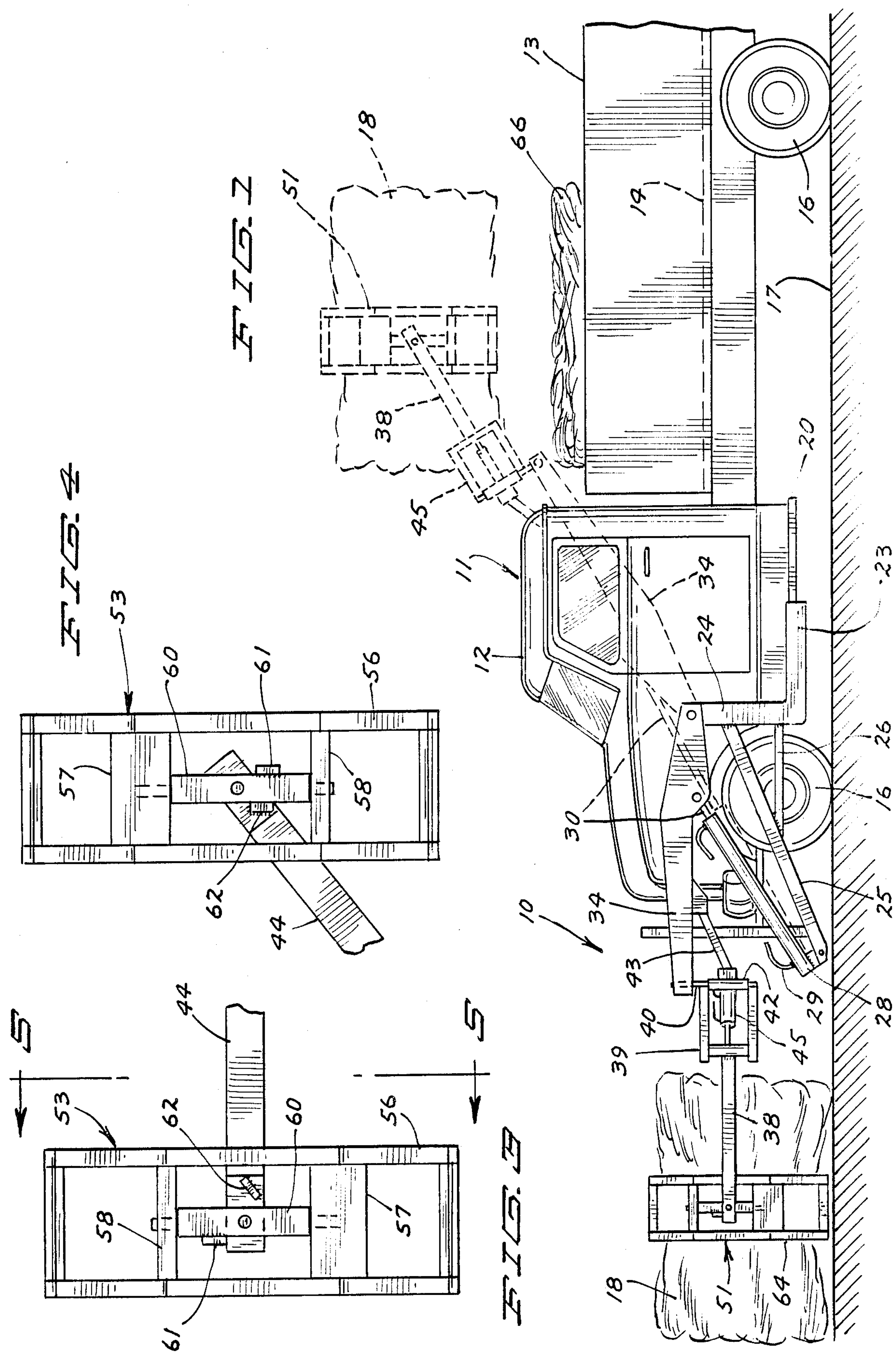
FIG. 1 is side elevational view of a load vehicle equipped with a hay bale loading apparatus according to the invention in process of grasping a stationary hay bale situated on the ground, and showing in broken lines a hay bale preparatory to loading on the vehicle trailer.
FIG. 3 is an enlarged view of one of the gripping members or hands pivotally assembled to the end of a loading arm with the loading arm in a horizontal position preparatory to grasping a hay bale.
FIG. 4 is a side elevational view of the hand of FIG. 3 shown in a pivoted position relative to the loading arm as in preparation to deposit a hay bale.
Figures 2, 5, 6:
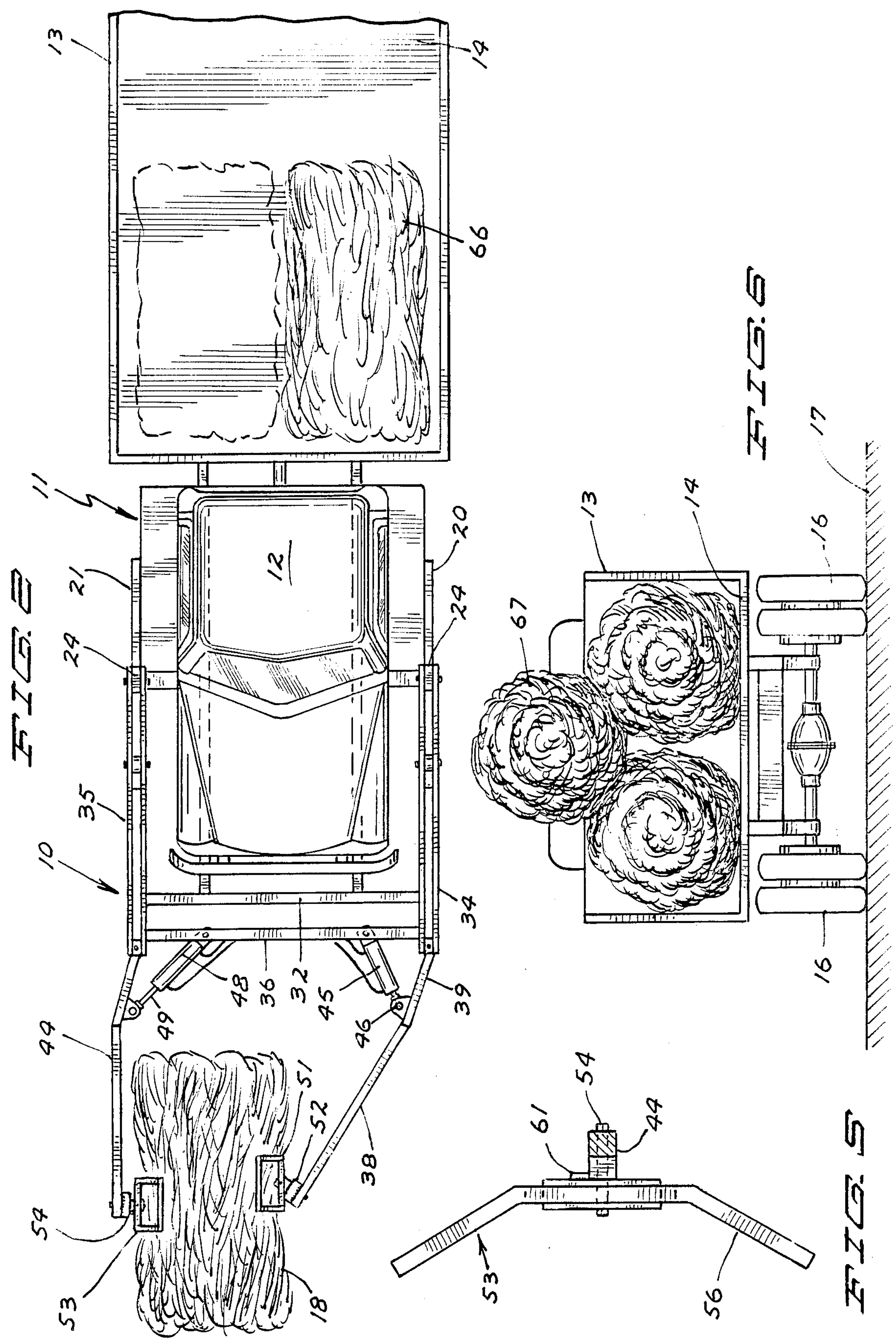
FIG. 2 is a top plan view of the vehicle and loading apparatus of FIG. 1.
FIG. 5 is an end view of the hand member of FIG. 3 taken along the line 5—5 thereof.
FIG. 6 is an end elevational view of the vehicle of FIG. 1 showing hay bales loaded thereon.

Referring to the drawings, there is shown in FIGS. 1 and 2 a hay bale lifting apparatus indicated generally at 10 installed on a vehicle 11 shown as a truck-type vehicle with a forward cab 12 and a trailer 13 having a trailer bed 14 shown foreshortened in FIGS. 1 and 2, supported on wheels 16 with respect to ground surface 17. Apparatus 10 is shown in full lines preparatory to lifting a hay bale 18 and in broken lines with hay bale 18 lifted to a position preparatory to deposit on trailer 13 in FIG. 1. Hay bale lifting apparatus 10 is adapted for lifting hay bales from ground 17 and depositing them in orderly fashion on trailer bed 14. Hay bales are stacked on trailer bed 14 first one on one side thereof, and a second on the opposite side, and a third deposited on top of the first two at an intermediate location.

Hay bale lifting apparatus 10 includes a stationary frame fixed to cab 12 having first and second L-shaped members 20, 21 mounted on opposite sides of cab 12 at the lower portion thereof. Each L-shaped member has a horizontal portion 23 rigidly fixed to suitable frame structure of cab 12 (not shown) at a lower portion thereof, and an upright column member 24 extended from the forward end of horizontal portion 23. A mounting strut 25 has one end fixed to an upper portion of column member 24 and extends forwardly and downwardly from column member 24. A support member 26 is fixed between column 24 and strut 25 for additional support of strut 25. The forward end of strut 25 carries one end of a double-acting hydraulically actuated lift motor 28 which receives hydraulic fluid through suitable fittings 29 to extend and retract a lift rod 30. The side of vehicle 11 opposite that shown in FIG. 1 carries identical frame structure (not shown). A transverse support member 32 connects the lower ends of the left-hand strut 25 and the right-hand strut (not shown).

A lift frame assembly rotatably mounted to the stationary frame includes first and second lift legs 34, 35 located on opposite sides of cab 12. Lift legs 34, 35 are pivotally connected at inner ends to the upper ends of vertical column members 24 of each L-shaped mounting member 20, 21 for coaxial pivotal movement about a generally horizontal axis. The movable end of rod 30 of hydraulic motor 28 is connected at an intermediate location to lift leg 34 for rotational movement of lift leg 34 about a horizontal axis located proximate the top of column member 24. The second or right lift leg 35 is similarly connected to a hydraulic motor for simultaneous powered rotational movement of both of the lift legs.

A transverse horizontal brace assembly 36 extends between and is securely fixed to the outer or forward ends of the lift legs 34, 35. A first or left load arm 38 has a bifurcated inner arm portion 39 terminating in a pivot rod 40 which is pivotally mounted in a sleeve 42 secured to brace assembly 36 and left lift leg 34. A support member 43 can extend between pivot sleeve 42 and left lift leg 34 for added support of sleeve 42. Left arm 38 is pivotal about an axis that is generally upright in the full line orientation shown in FIG. 1 and is perpendicular to the rotational axis of the lift legs.

A second or right load arm 44 is similarly pivotally mounted with respect to the opposite end of brace assembly 36 and right lift leg 35. Right load arm 44 is symmetrical to left load arm 38. Left and right load arms 38, 44 are mounted for pivotal movement about parallel axes for side-to-side movement with respect to cab 12. A first or left load arm actuator 45 has a cylinder end connected to brace assembly 36 and a movable rod 46 connected to left load arm 38 positioned for inward and outward movement of left load arm 38 upon retraction and extension of rod 46 with respect to the cylinder portion of actuator 45. Suitable hydraulic lines are provided connected to hydraulic controls (not shown) for actuation of rod 46 in conventional fashion. A second or right load arm actuator 48 has a cylinder portion assembled at one end to brace assembly 36 and an extendible and retractable rod 49 assembled to the right load arm 44 and positioned for outward and inward movement of the right load arm 44 upon extension and retraction of the rod 49 with respect to the cylinder portion of actuator 48. Hydraulic lines are provided extending to hydraulic controls (not shown) for selective actuation of the rod 49 to extend and retract the load arm 44.

A pair of articulated gripping or hand members are pivotally assembled to the ends of the load arms for pivotal movement about generally horizontal axes. First or left gripping member 51 is pivotally assembled by a shaft assembly 52 proximate the outer end of the first load arm 38. In like fashion, a second or right gripping member 53 is pivotally assembled by a shaft assembly 54 proximate the outer end of the second or right load arm 44. The first and second gripping members are symmetrical. As shown in FIGS. 3 through 5, right gripping member 53 has an outer open upright rectangular frame 56 with a slight inwardly facing C-shaped or concave profile. Transverse cross supports 57, 58 extend across frame 56 on opposite sides of center and between the longer legs of the frame. A longitudinal support bar 60 extends between the cross supports 57, 58. Shaft assembly 54 is assembled between the end of right load arm 44 and support bar 60. Shaft assembly 54, as shown in FIG. 3, is mounted slightly above center with respect to frame 56 so as to normally bias the frame 56 in the position shown in FIG. 3.

A first stop block 61 is secured to the longitudinal support bar 60 and extends outwardly therefrom as shown in FIG. 5. First stop block 61 is positioned to limit rotation of gripping member 53 in one direction by contact with the outer end of right load arm 44 as shown in FIG. 3. A second stop block 62 is fastened to the right load arm 44 toward the outer end thereof. Second stop block 62 is spaced inwardly from the longitudinal cross bar 60 of gripping member 53 in the orientation shown in FIG. 3, but is positioned to limit rotation of gripping member 53 in a second direction by contact with the longitudinal support bar 60 as shown in FIG. 4 to hold the gripping member 53 in a generally vertical orientation when load arm 44 is rearwardly inclined in the overhead position.

Left gripping member 51 similarly has a rectangular frame 64 and is mounted with respect to the end of left load arm 38 in similar fashion for cooperation with the right gripping member 53 and right load arm 44 to grasp and lift a hay bale to be loaded on trailer 13.

In use, lift apparatus 10 is used to lift and load a hay bale on one side of bed 14 of trailer 13, then lift and load a second hay bale placing it in side-by-side relationship to the first hay bale, then lift and load a third hay bale placing it centrally between and on top of the first two. As shown in FIGS. 1 and 2, a first hay bale 66 has already been loaded on the bed 14 of trailer 13 on the left side thereof. Truck 11 is then moved in proximity to a second hay bale 18 such that the hay bale is located in front of and toward the right side of the truck. As controlled by lift leg motors 28, the lift legs 34, 35 are in the down or forwardly extended position. As controlled by the load arm actuators 45, 48 the load arms 38, 44 are spread apart. The load arm actuators are operated to bring the load arms 38, 44 together with hay bale 18 still positioned right of center with respect to the truck. The grip members 51, 53 close in on the hay bale securely gripping it between them. Lift leg motors 28 are then actuated to lift the lift legs 34, 35 until they reach the overhead or up and rearwardly inclined position shown in phantom in FIG. 1 with the hay bale 18 poised over the bed 14 of trailer 13. During the initial lift procedure, the first stop members 61 prevent rotation of the gripping members in a direction counterclockwise as shown in FIG. 3 by contact of the first stop blocks 61 with respective outer ends of the lift arms 38, 44. As the lift legs 34, 35 and load arms 38, 44 pass an overcenter position, the gripping members 51, 53 rotate in a clockwise direction as viewed in FIGS. 3 and 4 to a second position where rotation is stopped by second stop block 62 making contact with longitudinal support bar 60. In this second position, the gripping members 51, 53 are held in a generally vertical orientation as shown in FIG. 1 in phantom such that the axis of bale 18 is horizontally disposed and bale 18 is poised over the right side of bed 14 of trailer 13. The gripping members 51, 53 are moved apart to let bale 18 drop into place with respect to the truck bed.

Subsequent to loading of the second bale 18, a third bale 67 is loaded on top of the first two as shown in FIG. 6. Third bale 67 is loaded by centrally approaching the bale when on the ground such that it is disposed generally in a line with the truck cab 12 and aligned with the intended position of the bale on the trailer 13. The bale is then lifted up and over cab 12 and properly positioned as previously described. Conventional means can be employed to move the loaded bales to the rear of the bed 14 so that an additional three bales can be loaded on the truck. The procedure is accomplished by a single truck operator without the necessity of leaving the truck cab. While the hay bales loaded are shown to be of the cylindrical variety, lift apparatus 10 is equally operable for loading hay bales of a rectangular or other configuration.

The embodiments of the invention in which an exclusive property or privilege is claimed are defined as follows:

1. A lifting and loading apparatus for use in conjunction with a vehicle having a load-bearing bed, comprising:

stationary frame means fixed to the vehicle on first and second opposite sides of the vehicle with respect to a vehicle center line;

a lift frame assembly movably assembled to the stationary frame means, said lift frame including a first lift leg having an inner end and an outer end, means pivotally connecting the inner end of the first lift leg to the stationary frame means on a first side of the vehicle permitting rotation of the outer end about a first horizontal axis in an arc extended between a generally horizontal extended position with respect to the vehicle and an overhead past vertical position with respect to the vehicle, a second lift leg having an inner end and an outer end, means pivotally connecting the inner end of the second lift leg to the stationary frame means on the second side of the vehicle in coaxial relationship with the first lift leg permitting rotation of the outer end of the second lift leg about said first horizontal axis in an arc in parallel relationship to the first lift leg, means connecting said outer ends of the first and second lift legs, and first power means for rotating the first and second lift legs between said positions;

a first rigid load arm having an inner end and an outer end, means pivotally connecting the inner end of the first load arm to the lift frame assembly on the first side of the vehicle in fixed relation to the lift frame assembly with respect to rotation about said first horizontal axis and permitting pivotal movement of its outer end about an axis perpendicular to the first horizontal axis and said outer end being movable in and through an arc intersecting the vehicle center line, a second rigid load arm having an inner end and an outer end, means pivotally connecting the inner end of the second load arm to the lift frame assembly on the second side of the vehicle in fixed relation to the lift frame assembly with respect to rotation about said first horizontal axis and permitting rotation of the outer end about an axis parallel to and spaced apart from the axis of rotation of the first load arm and said outer end being movable in and through an arc intersecting the vehicle center line, said outer ends of the first and second load arms movable toward and away from one another in side-by-side relationship with respect to the vehicle upon pivotal movement about respective pivotal axes, second power means for pivotal movement of the first and second load arms toward and away from one another, a first gripping member pivotally connected proximate the outer end of the first load arm and a second gripping member pivotally connected proximate the outer end of the second load arm whereby the second power means can be actuated to bring the outer ends of the first and second load arms toward one another to grip a load for lifting of the load upon pivotal movement of the first and second lift legs from the generally horizontally extended position to the overhead position for deposit of a load on the vehicle bed.

2. The lifting and loading apparatus of claim 1 wherein: means connecting the outer ends of the first and second lift legs comprises a brace assembly extended between the outer ends of the first and second lift legs.

3. The lifting and loading apparatus of claim 1 including: stop block means located on the lift arms and the gripping members to limit the amount of permissible rotation of each gripping member with respect to the corresponding lift arm.

4. The lifting and loading apparatus of claim 1 wherein: said second power means includes a first hydraulic load arm actuator connected between the first load arm and the lift frame assembly, and a second hydraulic load arm actuator connected between the second load arm and the lift frame assembly.

5. The lifting and loading apparatus of claim 4 wherein: said first power means includes at least one hydraulic lift frame actuator connected between the lift frame assembly and the stationary frame means.

6. The lifting and loading apparatus of claim 1 wherein: each gripping member includes an inwardly facing slightly C-shaped frame and support members extended between the frame.

7. The lifting and loading apparatus of claim 6 including: stop block means located on the lift arms and the gripping members to limit the amount of permissible rotation of each gripping member with the corresponding lift arm.

8. The lifting and loading apparatus of claim 7 wherein: said stop block means includes a first stop block located on the first gripping member to limit rotation of the first gripping member with respect to the first load arm in a horizontal position, and a second stop block located on the first lift arm positioned to limit pivotal rotation of the first gripping member in the overhead position, a first stop block located on the second gripping member to limit rotation of the second gripping member with respect to the second load arm in a horizontal position, and a second stop block located on the second lift arm to limit rotation of the second gripping member when in the overhead position.

9. The lifting and loading apparatus of claim 8 wherein: said second power means includes a first hydraulic load arm actuator connected between the lift frame assembly and the first load arm, and a second hydraulic load arm actuator connected between the lift frame assembly and the second load arm.

10. The lifting and loading apparatus of claim 9 wherein: said first power means includes at least one hydraulic lift frame actuator connected between the lift frame assembly and the stationary frame means.

11. A hay bale loader comprising:

a load vehicle having a cab and having a trailer bed for transport of hay bales;

a first stationary frame member fixed on a first side of the cab and a second stationary frame member fixed on a second side of the cab opposite the first side with respect to a cab center line;

a lift frame assembly movably assembled to the stationary frame members, said lift frame assembly including a first lift leg having an inner end pivotally connected to the first stationary frame member, a second lift leg having an inner end pivotally connected to the second stationary frame member for pivotal rotation about a horizontal axis coincidental with the axis of rotation of the first lift leg, said lift legs having outer ends rotatable in parallel relationship about said generally horizontal axis between a first generally horizontally and forwardly extending position with respect to the cab for picking up a hay bale and a second overhead and rearward position with respect to the cab poised over the trailer bed to deposit a hay bale on the trailer, a brace assembly connecting the outer ends of the first and second lift legs, and first power means for rotating the first and second lift legs between said positions;

a first rigid load arm having an inner end connected to the lift frame assembly proximate the outer end of the first lift leg and an outer end forwardly extending when the lift frame is in the first position, a second rigid load arm having an inner end connected to the lift frame assembly proximate the outer end of the second lift leg and an outer end forwardly extending when the lift frame is in the first position, means pivotally connecting the inner ends of the first and second load arms to the frame assembly permitting pivotal movement of the outer ends of the first and second load arms about parallel axes that are perpendicular to the horizontal axis of rotation of the lift legs, said outer ends being movable in and through arcs inwardly extended toward and through the cab center line from the forwardly extended positions whereby said first and second load arms outer ends are movable toward and away from one another upon pivotal movement about respective pivotal axes in side-to-side relationship relative to the cab in order to pick up a hay bale located centrally of or offset from the center line of the cab, and second power means for pivotal movement of the first and second load arms toward and away from one another;

a first curved gripping member, means pivotally connecting the first gripping member proximate the outer end of the first load arm for pivotal movement about a generally horizontal axis, a second curved gripping member, means pivotally connecting the second gripping member to the second load arm proximate the outer end thereof whereby the second power means can be actuated to bring the gripping members toward one another to grip a hay bale for lifting of the hay bale upon pivotal movement of the first and second lift legs by the first power means from the generally horizontally extended position to the overhead position for deposit of the hay bale on the trailer bed.

12. The lifting and loading apparatus of claim 11 including: stop block means located on the lift arms and the gripping members to limit the amount of permissible rotation of each gripping member with respect to the corresponding lift arm.

13. The lifting and loading apparatus of claim 11 wherein: said second power means includes a first hydraulic load arm actuator connected between the first load arm and the lift frame assembly, and a second hydaulic load arm actuator connected between the second load arm and the lift frame assembly.

14. The lifting and loading apparatus of claim 13 wherein: said first power means includes at least one hydaulic lift frame actuator connected between the lift frame assembly and the stationary frame means.

15. The lifting and loading apparatus of claim 11 wherein: each gripping member includes an inwardly facing slightly C-shaped frame and support members extended between the frame.

16. The lifting and loading apparatus of claim 15 including: stop block means located on the lift arms and the gripping members to limit the amount of permissible rotation of each gripping member with the corresponding lift arm.

17. The lifting and loading apparatus of claim 11 wherein: said first power means includes at least one hydraulic lift frame actuator connected between the lift frame assembly and the stationary frame means.

* * * * *

UNITED STATES PATENT AND TRADEMARK OFFICE
CERTIFICATE OF CORRECTION

PATENT NO. : 4,578,008

DATED : March 25, 1986

INVENTOR(S) : Harold T. Gleason

It is certified that error appears in the above-identified patent and that said Letters Patent is hereby corrected as shown below:

Column 4, claim 1, line 67, "horizontal" should be -- horizontally --.

Column 5, claim 1, line 24, "second" should be -- first --.

Column 8, claim 13, line 12, "hydaulic" should be -- hydraulic --.

Column 8, claim 14, line 16, "hydaulic" should be -- hydraulic --.

Signed and Sealed this

*Twenty-second* Day of *July 1986*

[SEAL]

*Attest:*

DONALD J. QUIGG

*Attesting Officer* *Commissioner of Patents and Trademarks*